July 31, 1962
F. S. GRAHAM ET AL
3,046,604
WATERPROOF STATOR CONSTRUCTION FOR SUBMERSIBLE
DYNAMOELECTRIC MACHINE
Filed Feb. 4, 1958
3 Sheets-Sheet 1
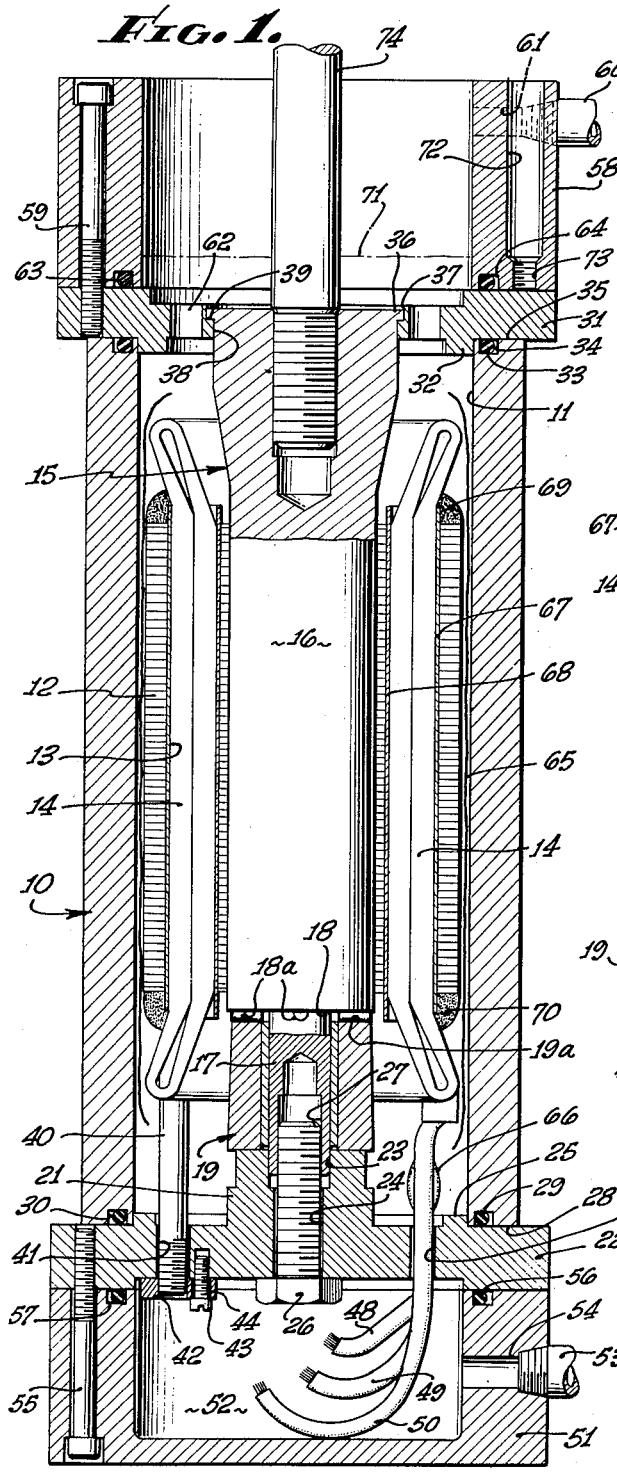
FRANK S. GRAHAM,
PETER S. KOMOR,
ALBERT REDDING, JR.
INVENTORS
BY Flam and Flam
ATTORNEYS.

July 31, 1962        F. S. GRAHAM ET AL        3,046,604
WATERPROOF STATOR CONSTRUCTION FOR SUBMERSIBLE
DYNAMOELECTRIC MACHINE
Filed Feb. 4, 1958        3 Sheets-Sheet 2
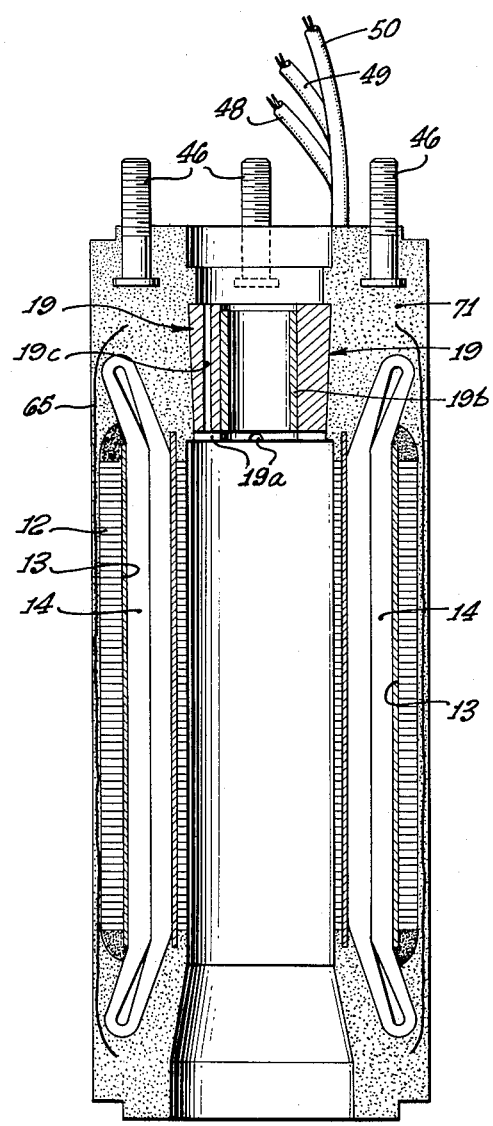
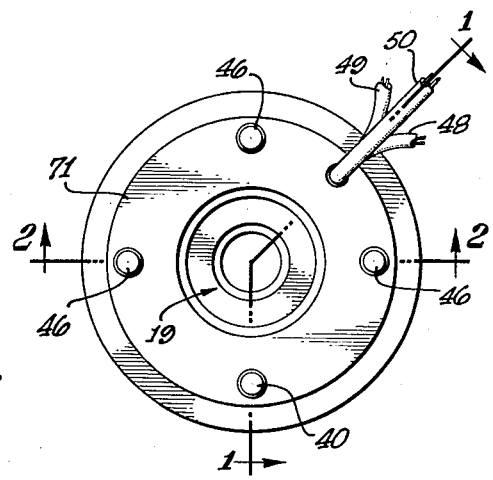
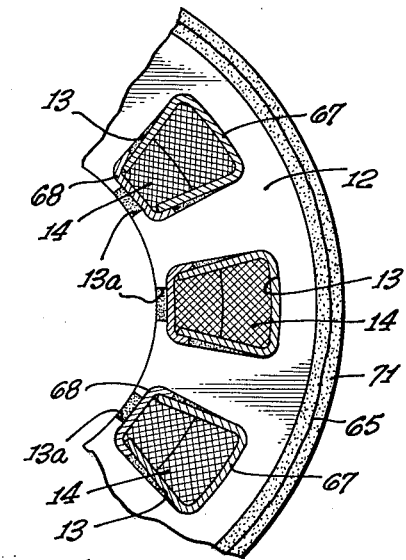
FRANK S. GRAHAM,
PETER S. KOMOR,
ALBERT REDDING, JR.
INVENTORS.
BY *Hamm and Hamm*
ATTORNEYS.

FRANK S. GRAHAM,
PETER S. KOMOR
ALBERT REDDING, JR.
INVENTORS.

BY Flam and Flam

ATTORNEYS.

… …

United States Patent Office 3,046,604
Patented July 31, 1962

3,046,604
WATERPROOF STATOR CONSTRUCTION FOR SUBMERSIBLE DYNAMOELECTRIC MACHINE
Frank S. Graham and Peter S. Komor, Los Angeles, and Albert Redding, Jr., Southgate, Calif., assignors to U.S. Electrical Motors, Inc., Los Angeles, Calif., a corporation of California
Filed Feb. 4, 1958, Ser. No. 713,131
1 Claim. (Cl. 18—36)

This invention relates to a submersible motor, and particularly to an encapsulated stator structure and the method of making the same.

The primary object of this invention is to provide a new stator structure wherein plastic material forms a casing or housing for stator laminations and windings therefor, as well as a complete insulation covering to prevent contamination, short-circuiting and breakdown. In this manner, the use of metal housing shells and even the use of one or both end brackets is avoided.

It is another object of this invention to provide a new submersible motor structure of this character in which, in furtherance of simplification, a bearing for a rotor shaft is cast in place so that a bracket for the bearing structure is made unnecessary.

Still another object of this invention is to provide a new motor of this character in which the plastic encapsulating material fulfills several essential requirements, including (1) high tensile strength for supporting substantial thrusts, thereby fulfilling the function of the now obviated metal casing parts, (2) exceptional insulation characteristics, providing high temperature resistance for appropriate isolation of windings from the ambient water, and (3) appropriate plastic characteristics to facilitate handling during molding processes.

In furtherance of these objects, there is used a thermosetting, epoxy-type resin which possesses exceptional rigidity in addition to the other named characteristics. There is also used glass fabric reinforcement for adding appropriate tensile strength.

Another object of this invention is to provide a simple structure in which mounting bolts or studs are imbedded in the plastic material, whereby the stator structure may be secured to a pump or the like without requiring adapter brackets.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a longitudinal sectional view of a mold structure in which stator laminations and stator windings are in place preparatory to injection of the plastic material, and taken along a plane corresponding to line 1—1 of FIG. 4;

FIG. 2 is a longitudinal sectional view of the completed stator structure removed from the mold, and taken along a plane corresponding to line 2—2 of FIG. 4;

FIG. 3 is a sectional view similar to FIG. 2, but illustrating the stator in its normal orientation, and taken along the same plane as FIG. 2;

FIG. 4 is a top plan view of the stator structure illustrated in FIG. 3;

FIG. 5 is an enlarged fragmentary sectional view showing the stator slot liners in detail;

Figures 6, 7:
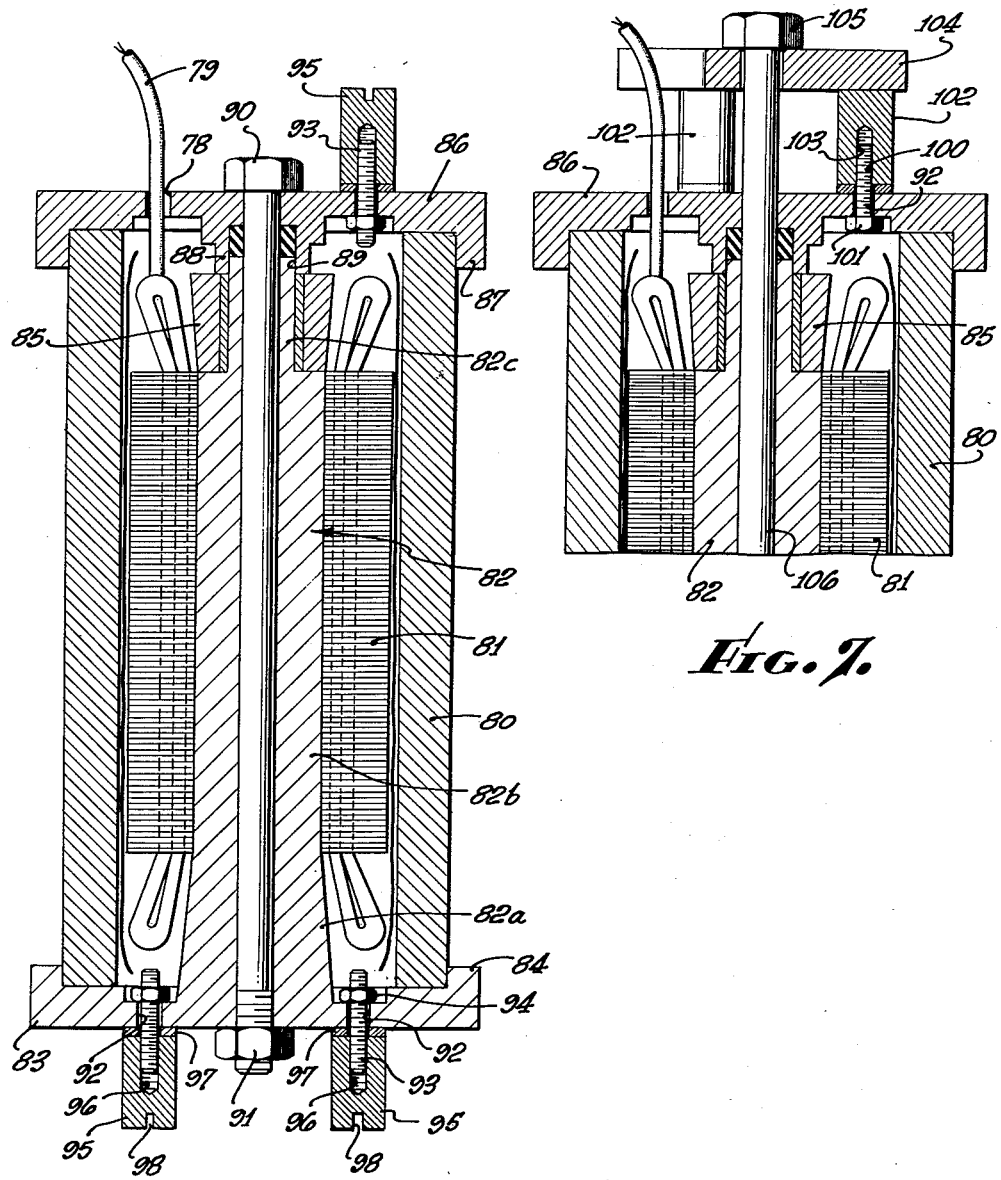
FIG. 6 is a longitudinal sectional view of a modified mold structure.
FIG. 7 is a fragmentary longitudinal sectional view illustrating another means for positioning bolts in the mold.

In FIG. 1, there is illustrated a mold structure in which wound stator liminations are placed. Plastic material completely surrounds the stator liminations, leaving exposed only end conductors for connection to an external circuit, and the stator bore for cooperation with a rotor (not shown). The stator slots are lined with a material that bonds to the encapsulating material in a manner to be described hereinafter.

A mold member 10, which is generally of cylindrical configuration, defines a correspondingly cylindrical mold cavity 11. Supported centrally of the mold member 10 is a stack of stator laminations 12 having lined slots 13 in which the usual stator windings 14 are accommodated. The stator laminations 12 are supported so that there is peripheral clearance between them and the interior surface of the mold member 10. Plastic material, when injected into the chamber 11, thus forms a housing about the periphery of the stator laminations 12.

For supporting the stator laminations 12 in proper axial alignment, an elongated bore plug 15 is provided. The bore plug 15 has a central cylindrical portion 16 which fits the bore provided by the stator laminations 12. The plug 15, of course, also keeps the stator bore clear of plastic material.

The bore plug 15 has a lower reduced extension 17 forming a downwardly facing shoulder 18. The reduced extension 17 extends through, and the shoulder formed thereby rests upon, a bearing assembly 19 about which is integrally cast the plastic material so as to keep the bearing assembly 19 in place in position immediately beneath the lower end of the stator laminations 12.

The upper surface of the bearing is radially slotted, as at 19a. This ultimately provides radial passages forming part of the lubricating path for the bearing. The bearing has an internal sleeve 19b providing a pump operated by the rotor shaft. Lubricant is withdrawn from the slots 19a and returned via longitudinal passages 19c. The passages 19c are drilled as the stator is completed, as shown in FIG. 3. Protuberances 18a, provided at the shoulder 18 of the bore plug, fit the slots 19a The bearing assembly 19, which serves to support one end of the rotor, in turn rests upon a central hub portion 21 of the mold structure (FIG.1) formed on a lower bracket or closure plate 22 at the lower end of the mold member 10.

In order to determine precise alignment between the cylindrical portion 16 of plug 15 and the mold member 10, both the plug 15 and the mold member 10 fit the lower bracket 22. Thus, the end of the plug extension 17 projects within, and is guided by an upper enlargement 23 of, a through aperture 24 formed in the hub 21; and the mold member 10 fits over an intermediate annular land or shoulder 25 formed at the corresponding side of the bracket 22. In this way, concentricity of the member 10 and plug 15 is ensured.

A cap screw 26, extending upwardly through the plug aperture 24, threadedly engages a tapped aperture 27 formed in the plug extension 17. Thus, the plug 15 is firmly held in place on hub 21.

The lower end surface 28 of the mold member 10 rests upon the closure plate or bracket 22, and an O-ring 29, accommodated in an annular groove 30 formed in this end surface 28, engages the bracket 22 to ensure a sealed relationship between the parts 10 and 22 at the lower end of the mold cavity 11.

In a similar manner, the upper end of the plug 15 is aligned with the upper end of the mold member 10. An upper bracket or closure plate 31 accomplishes this function. It has an intermediate annular land or flange 32 received within the upper end of the mold cavity 11. An O-ring 33, accommodated in an annular groove 34 formed in the upper end surface 35 of the mold member 10, seals the upper end of the mold cavity 11 between the parts 31 and 10.

The bracket 31 also guides and positions the plug 15. Thus, the upper end of the stator plug 15 has an annular flange 36 adjoining a cylindrical portion of the plug 15. The flange 36 is guided within an enlarged upper end 37 of a central bore 38 of the bracket 31. The flange 36 rests upon the shoulder 39 formed by the enlargement 37. The plug 15 accordingly is guided by the upper bracket 31, and the upper portion of the mold member is, in turn, aligned with respect to the upper plug 31.

The stator laminations are axially centered in the mold. The axial position of the stator laminations 12 is determined by a spacing stud 40. The stud 40 projects into the mold cavity 11 through an aperture 41 in the plate 22. The upper end of this stud enters between end turns of the windings 14 and engages the lowermost lamination of the stator structure. For adjustably securing the stud 40 to the bracket 22, an adjustable abutment nut 42 is mounted on the lower end of the stud 40. The nut 42 is held against the lower edges about the opening 41 by the aid of a small cap screw 43 which extends through an eccentric aperture or groove 44 formed in the nut and engages a threaded opening 45 in the bracket 22. By adjusting the position of the nut 42 along the post 40, the extent that the post 40 projects upwardly from the bracket or plug 22 is varied. Accordingly, the position of the stator laminations 12 is determined.

Plastic material encloses the post 40, and its lower threaded end forms a means whereby the stator may be attached to the casing of a pump structure or the like. (See FIG. 3.) Three supplemental bolts 46 (see also FIG. 4) also project within the mold cavity 11 so that they are partially imbedded in encapsulating material. These bolts 46 supplement the post 40 to provide a series of angularly spaced connecting means for the pump housing. The bolts 46 have heads about which the plastic material extends so that they are firmly held in position. Nuts, similar to the nut 42, hold the bolts 46 in position relative to clearance openings in the lower plug 22 so that their heads project into the mold cavity 11. Cap screws, similar to the cap screws 43, may be used to secure the complementary nuts for the bolts 46 in position against the lower plug 22.

A hole 47, formed in the lower plug or bracket 22, serves as a means for outward passage of a plurality of leads 48, 49 and 50 from the stator windings 14.

In order effectively to inject plastic material into the mold cavity 11, the mold structure is first evacuated. For this purpose, the lower bracket 22 rests upon a cup 51. The cup 51 forms with the lower surface of the bracket 22 a chamber 52 that is evacuated by a vacuum conduit 53 threadedly accommodated in a transverse aperture 54 of the cup 51. The mold cavity 11 is appropriately evacuated, communication being established between the chamber 52 and the mold cavity 11 via the opening 47 for the leads 48, 49 and 50 as well as the opening for the stud 40 and the supplemental bolts 46. Elongate cap screws 55 secure the cup 51 to the lower bracket 22.

An O-ring 56, accommodated in an annular groove 57 in the upper annular portion of the cup 51, establishes a seal between the parts 22 and 51.

A filling chamber is provided at the top of the molding apparatus. A hollow, open-ended fill ring 58 is provided for this purpose. The fill ring is secured to the upper bracket 31 by a series of cap screws 59. An injection head (not shown) closes the upper end of the fill ring 58. A conduit 60, which cooperates with a transverse port 61 formed in the fill ring 58, cooperates with conduit 53 at the cup 51 to evacuate the entire mold structure prior to the admission of plastic material. An O-ring 63, accommodated in an annular groove 64 at one end surface of the fill ring 58, abuts the upper surface of the bracket 31 in order to establish a seal between the parts 58 and 31. Appropriate means is provided for urging the parts of the mold structure together during the injection step.

If desired, only the conduit 60 need be used appropriately to evacuate the cavity. In this event, the holes in the lower plug 22 about the leads and the bolts are sealed.

After the mold cavity 11 and associated parts are evacuated, the plastic material is admitted into the fill ring 58. The plastic material passes through a series of angularly spaced fill openings 62 formed in the upper bracket 31, and the entire mold cavity is filled.

The encapsulating material comprises an epoxy-type resin that has appropriate rigid characteristics after it is thermally set. In order to add tensile strength, the stator laminations 12 are wrapped with a glass cloth 65 or other fibrous material having suitable waterproof and strength characteristics. This glass cloth 65 extends axially substantially the entire distance between the end brackets 22 and 31. Hence, it extends substantially from end to end of the encapsulated stator structure.

Each of the leads 48, 49 and 50 is coated with a bonding paste, as at 66, that bonds both to the insulation coating of the leads 48, 49, 50 as well as to the encapsulating epoxy resin material. Accordingly, moisture is prevented from entering along the leads 48, 49, 50 at the bonding paste 66.

The slots 13 in the stator laminations 12, as shown clearly in FIG. 5, are completely lined by elongate, complentary, U-shaped cell wall elements 67 and 68 made of glass cloth impregnated with epoxy resin. The epoxy material is only partially cured to ensure some measure of flexibility whereby the wall elements may be conformed to the slot walls. The ends of the elements 67 and 68 overlap each other, and one of them 68 closes the reduced slot opening 13a. The wall elements 67 and 68 are formed by heat to fit the slot walls.

The ends of the cell wall elements 67 and 68, as illustrated clearly in FIG. 1, extend beyond the end laminations and thus project into the main mass of encapsulating material. The encapsulating material also impregnates the spaces between the windings in the slots. Bonding between the cell wall elements 67 and 68 and the epoxy resin encapsulating material filling the cavity 11 is promoted because the resin of the cell wall elements is only partially cured.

Glass or other fibrous filling material 69 and 70, wrapped circularly about the end turns of the windings 14 at the respective ends of the stator laminations, serves two functions. It supports the end turns to ensure that they are spaced from the outer portion of the mold, thereby increasing the insulation effect of the encapsulating material. It also takes up space for minimizing the quantity of encapsulating material necessary to fill the mold.

After the thermosetting epoxy resin is introduced into the mold cavity 11, the application of vacuum at the conduits 60 and 53 is continued for twenty or thirty minutes. After the vacuum is removed, the structure is now subjected to curing temperatures for a sufficient time prior to removal of the mold parts from the completed stator structure. The final curing of the epoxy material of the cell walls is effected at this time. Curing may be accomplished in two stages. At first, the structure may be subjected to temperatures of approximately 155° F. for sixteen or so hours, and thereafter there is provided a terminal curing period of three hours at a slightly higher temperature, such as about 200° F.

A residue of material, as at 71 (FIG. 1), in the chamber provided by the fill ring 58 and supplementary sealing material at the joints of the mold prevents ready separation of the fill ring 58 from the end bracket 31. In order to break this residue 71 away, jack screws are inserted, such as at the bore 72 provided in the fill ring 58. The bore 72 has threads 73 at the end adjoining the end bracket 31. By screwing down the jack screw in this threaded part 73, a reaction is imposed upon the end bracket 31 to force the fill ring 58 away. The lower cup 51 is removed and the bolt 26 is removed as well as the cap screws 43 and the abutment nuts 42. The stator plug 15 is withdrawn through the end bracket 31. A post 74, threaded to the upper end of the plug 15, facilitates this operation.

As the plug 15 is withdrawn, the bearing structure 19 remains in place. An externally tapered configuration of the bearing structure 19 ensures this result. The bearing structure 19 is likewise prevented from moving downwardly by virtue of the fact that that portion of the boss 21 formed on the lower bracket 22 is smaller than the end surface of the bearing structure 19 which it engages. Accordingly, the encapsulating material extends partially over the lower end surface of the bracket structure 19 to retain it appropriately in position.

The stator structure is now completed. For use, the studs 40, 46 are upwardly oriented (FIG. 3) for mounting to a pump casing or the like. A rotor is inserted from the lower end of the stator structure, and a supporting bracket and seal structure (not shown) affixed at the lower end of the stator structure. The plastic material effectively supports the weight of the rotary devices, including the pump impeller and the rotor structure.

In the form illustrated in FIG. 6, a mold member 80, similar to the mold member 10, receives stacked laminations 81. A bore plug 82, extending upwardly in the bore provided by the laminations 81, is formed integrally with a lower bracket or closure member 83 cooperating with the lower end of the mold member 80. The closure 83 has a peripheral, upwardly extending flange 84 in which the lower end of the mold member 80 is telescopically received for alignment purposes.

Adjacent the base of the closure 83 there is a tapered or frusto-conical portion 82a adjoining the cylindrical portion 82b of the plug. The start of the conical portions defines a limit of downward movement of the end laminations.

The bore plug 82 has a reduced extension 82c at its upper end extending through a bearing structure 85 similar to the bearing structure 19 in the previous form. This bearing structure 85 is also molded in place.

An upper bracket or closure member 86 closes the upper end of the mold member 80 and has a depending flange 87 telescopically receiving the upper end of the mold member 80. Leads 79 from the stator windings pass upwardly through an aperture 78 in the upper closure 86.

The upper closure 86 has a central hub flange 88 defining a recess 89 telescopically receiving the reduced upper end 82c of the bore plug 82.

A tie bolt 90 extends through aligned apertures in the upper closure 86 and the plug 82. A nut 91 engages a threaded lower end of the tie bolt 90 and clamps the parts against the mold member 80.

Several mounting studs 93 are imbedded at the ends of the molded stator for mounting purposes. The upper and lower closure members 83 and 86 have a series of apertures 92 at which the studs 93 are accommodated. Each stud 93 carries a nut 94 that is held against the edges about the inside of the corresponding closure aperture 92 during the molding process. For this purpose, the outer end of each stud 93 is engaged by a clamp nut 95 having a central threaded opening 96 in which the accessible end of the bolt 93 is received. A sealing washer 97, interposed between the end of the clamp nut 95 and the edges about the outer end of the aperture 92, seals the mold structure. The clamp nut 95 has a slotted end 98 whereby it may be operated by a suitable tool.

After the molding operation is completed, the clamp nuts 95 and sealing washers 97 are removed. The mold plugs, the nuts 94 and the inner end of the stud 93 are retained imbedded in the plastic material. The mold parts are then removed, and the studs 93 are appropriately in position.

In the form of FIG. 7, bolts 100 are illustrated that have heads 101 located within the mold cavity and shanks projecting through the apertures 92 in the plug 86. Outer supporting elements 102 hold the bolts 100 in place during molding. The elements 102 have apertures 103 in which the outer ends of the bolts 100 are threadedly received.

The supports 102 are clamped against the outer surface of the closure 86 by the aid of a plate 104. The plate 104 is engaged by the head 105 of a tie bolt 106 extending through the mold parts. The supports 102, in this instance, hold the upper closure 86 against the end of the mold member 80.

When the molding is completed, the tie bolts are removed, the plate 104 is removed and the supports 102 are unthreaded. The mold closures can now be removed. The bolt heads 101 are appropriately imbedded within the encapsulating material.

The inventors claim:

A mold structure for encapsulating a stack of apertured and slotted stator laminations having a substantially cylindrical external contour: a hollow open ended mold member having a substantially cylindrical space of a diameter in excess of that of the stack of stator laminations; detachable end members for sealing said space; a plug fixed with respect to the mold member when the end members are in place and extending axially of said space to form a guiding post fitting the apertures of said stator laminations to hold them entirely in peripheral clearance relationship with respect to said space; and abutment means engaging the stator laminations at a place spaced from the stator slots and limiting axial movement of said stack of stator laminations and holding the stack of laminations inwardly of the ends of the mold member in spaced relationship to the end members, comprising a threaded member projecting partially beyond said space at one of said end members, and adapted to be embedded in the encapsulating material to form, in addition, means for attachment of the encapsulated structure to companion apparatus.

References Cited in the file of this patent

UNITED STATES PATENTS

| 1,440,952 | Apple | Jan. 2, 1923 |
| 1,584,502 | Apple | May 11, 1926 |
| 1,925,891 | Apple | Sept. 5, 1933 |
| 2,286,993 | Naul | June 16, 1942 |
| 2,305,252 | Hayden | Dec. 15, 1942 |
| 2,366,401 | Haskell | Jan. 2, 1945 |
| 2,611,930 | Hill et al. | Sept. 30, 1952 |
| 2,646,535 | Coggeshall et al. | July 21, 1953 |
| 2,711,492 | Ballman | June 21, 1955 |
| 2,719,239 | Wanting | Sept. 27, 1955 |
| 2,724,862 | Merrill et al. | Nov. 29, 1955 |
| 2,724,869 | Merrill et al. | Nov. 29, 1955 |
| 2,749,456 | Luenberger | June 5, 1956 |
| 2,763,032 | Fay | Sept. 18, 1956 |
| 2,770,012 | Bowerman | Nov. 13, 1956 |
| 2,770,013 | Crooker | Nov. 13, 1956 |
| 2,856,639 | Forrest et al. | Oct. 21, 1958 |
| 2,857,626 | Wagner et al. | Oct. 28, 1958 |
| 2,889,423 | Yochum | June 2, 1959 |

FOREIGN PATENTS

| 941,837 | Germany | Apr. 19, 1956 |

OTHER REFERENCES

Plastics Engineering Handbook, Society of the Plastic Industry, 1954, pp. 494 and 495.